Nov. 3, 1942.  W. C. STARKEY  2,300,712
OVERRUNNING DRIVE FOR LAWN MOWER CUTTERS
Filed Dec. 7, 1939
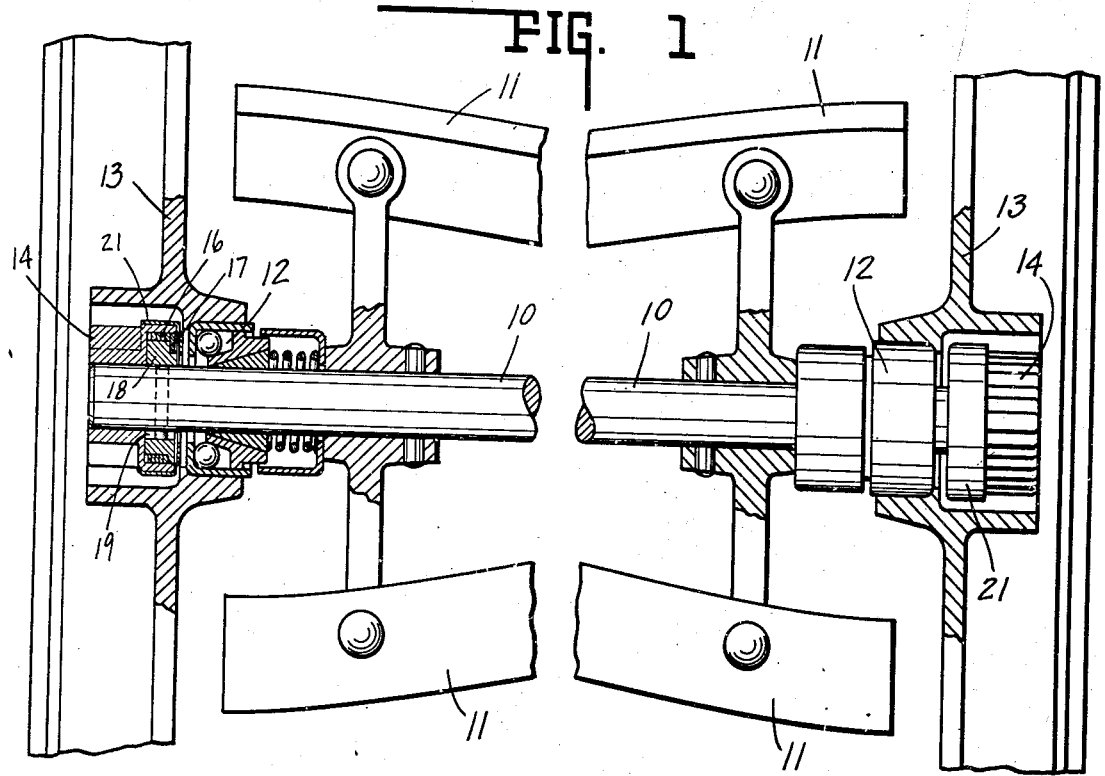
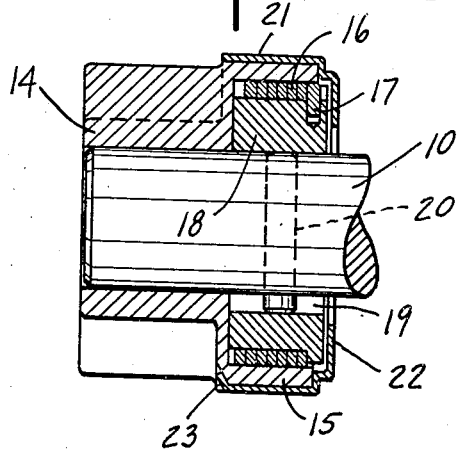
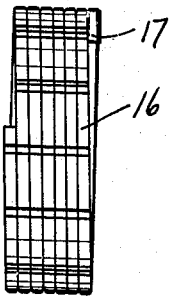
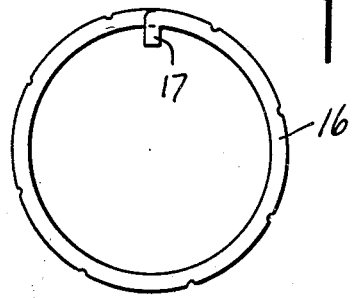
INVENTOR.
WILLIAM CARLETON STARKEY.
BY Lockwood, Goldsmith & Galt,
ATTORNEYS.

Patented Nov. 3, 1942

2,300,712

UNITED STATES PATENT OFFICE 2,300,712

OVERRUNNING DRIVE FOR LAWN MOWER CUTTERS

William Carleton Starkey, Indianapolis, Ind., assignor to L. G. S. Spring Clutches, Incorporated, Indianapolis, Ind., a corporation Application December 7, 1939, Serial No. 308,030

2 Claims. (Cl. 56—294)

This invention relates to an overrunning drive for lawn mower cutters.

The cutting reels of present-day lawn mowers are ordinarily driven from the ground wheels through a pair of ratchet connections which permit the cutter to remain stationary when the mower is moved backward but which drive the cutter when the mower is moved forward. These ratchet constructions are subject to several disadvantages. For the sake of strength, the ratchet teeth must be made relatively large and hence few in number. The usual number is three teeth at each end of the cutter shaft. The small number of teeth results in considerable lost motion each time the mower is started forward so that the cutter is invariably late in starting its rotation.

Another disadvantage is due to the fact that in turning the mower the two ground wheels move through different distances. Thus the ratchet teeth on the two ends are never in alignment with each other and the drive of the cutter is invariably from one end only. This fact is responsible for added strain on the parts especially when a stick or other foreign object is picked up between the rotating and the stationary cutter bar.

Perhaps the greatest disadvantage of the ratchet construction is noise. When the mower is suddenly stopped after a vigorous forward movement, the cutter over-travels and the "dodging keys" which serve as pawls move over the ratchet teeth with a characteristic clatter well known to late sleepers whose neighbors have an early morning lawn mowing habit. The same noise is produced each time the lawn mower is moved backward and the keys similarly engage the ratchet teeth.

One object of the present invention is to provide a driving construction for lawn mower cutters which eliminates lost motion in starting.

Another object is to provide a drive construction in which the cutter is driven equally from both ends.

Another and very important object is to provide a silent drive for a lawn mower cutter.

Another object of the invention is to provide a self-contained driving unit which may be substituted for the ratchet units now in use without other changes in the mower design.

These objects and others are attained by the construction described in the accompanying drawing and the following description and claims:

Fig. 1 is a view partly in section of portions of the cutting mechanism of a lawn mower with a drive therefor constructed in accordance with the invention. Fig. 2 is an enlarged sectional view of the driving unit. Fig. 3 is an elevational view of one of the elements thereof and Fig. 4 is an end view of the same element.

In the preferred form of the invention shown in the drawing by way of illustration there is provided a cutter shaft 10 carrying the usual cutting elements 11 of a lawn mower. The shaft 10 is supported on ball bearing units 12 of a conventional form which are mounted in the frame structure 13 of the mower. A pinion member 14 is freely mounted on each end of the shaft 10 and each of said pinions may be driven by the corresponding ground wheel of the mower through suitable gearing, not shown. Each pinion member is formed with a boss 15 having an internal bore forming a spring pocket in which there is seated a coiled clutch spring 16. The spring 16 is provided at one end with an inturned toe 17 engaging a suitable opening in a collar member 18 mounted on the shaft 10. The collar member is provided with a keyway 19 adapted to receive a key 20 mounted in the shaft 10. A retaining cap 21 surrounds the boss 15 and has an inturned portion 22 adapted to retain the collar member 18 and spring 16 within the spring pocket. The cap 21 is retained in place by crimping the edge at suitable intervals into recesses in the surface of the boss 15 as shown at 23 in Fig. 2.

The springs 16 are formed with an external diameter which in the free state is slightly greater than the internal diameter of the spring pocket. It is thus always in frictional engagement with the internal surface of the spring pocket. The two springs 16 are so wound that when their corresponding pinions 14 are rotated by forward movement of the mower, the frictional force tends to expand the spring into clutching engagement with the interior surface of the spring pocket. Torque is exerted by the pinion member on the spring and is transmitted through the spring to the collar member 18 by means of the toe 17. Since the collar member 18 is keyed to shaft 10 the torque is transmitted to the cutter shaft and cutting elements. Preferably one of the springs is wound in a right-hand direction and the other in a left-hand direction and the toes 17 of both springs are arranged on the inner ends of the springs. However, the same result is obtained by winding both springs in the same direction and placing the toe of one spring on the inner edge and the toe of the other on the outer edge.

The action of each of the springs 16 in clutching its mating spring pocket is practically instantaneous so that there is no lost motion of the cutter when the mower is started forward. Each spring takes hold immediately upon the start of forward movement irrespective of the prior position of the ground wheels. The drive therefore is always from both ends of the cutter and each spring transmits its proportionate share of the cutting torque and its proportionate share of the strain when rotation of the cutter is suddenly stopped by intrusion of a foreign object.

When the mower is moved backward, the direction of the frictional force on the external surface of the springs is such as to wrap the springs downwardly out of engagement with their mating clutch surfaces and to permit said clutch surfaces to move freely and silently over the same. The same condition exists when the mower is suddenly stopped and the cutter over-travels. Thus the noise attendant on the operation of the ratchet type of construction is entirely eliminated.

The fact that the collar member and spring are enclosed in a pocket within the pinion member permits the drive construction to be so compactly arranged that it may occupy the same or less space than the ratchet constructions now in use. The use of the retaining cap 21 holds the driving unit together as a unitary assembly which may be easily substituted for the present pinion and ratchet members, and the keyway 19 is properly placed so that the present "dodging keys" may be used in the position of pin 20 with only a slight change in length. No other change in mower design is necessary to adapt a present mower for use of the invention.

The foregoing specification describes the invention in one of its preferred forms, the details of which may be varied between wide limits without departing from the scope of the invention as defined in the appended claims.

The invention claimed is:

1. A lawn mower having the usual ground engaging wheels at each end, a rotatable cutter shaft having its ends disposed adjacent to said wheels, a pinion mounted for free rotary movement on each end of said shaft, each of said ground wheels engaging to rotate its adjacent pinion, a clutch interposed between each of said pinions and said shaft, said clutch including a spring pocket with a coiled clutch spring therein operating at all times to positively and instantly establish a drive connection between said pinions and said shaft when said wheels rotate in a forward direction and to instantly sever said drive connections when said wheels are rotated in the reverse direction.

2. A lawn mower having the usual ground engaging wheels at each end, a rotatable cutter shaft having ends disposed adjacent to said wheels, a pinion mounted for free rotary movement on each end of said shaft, each of said ground wheels engaging to rotate its adjacent pinion, each of said pinions having a spring pocket formed therein concentric with said shaft, an over-running clutch spring seated in each of said pockets, the outer surfaces of said springs engaging the inner surfaces of said pockets, each of said springs being wound in the proper direction to be expanded into clutching engagement with said pocket surfaces when the ground wheels are rotated in one direction and to be contracted to permit free movement of said pinions when the ground wheels are moved in the reverse directions, and an end of each of said springs anchored to said cutter shaft.

WILLIAM CARLETON STARKEY.